June 16, 1959 W. WOODS-HILL 2,890,830

ELECTRONIC ADDER APPARATUS WITH SUM RADIX CORRECTION MEANS

Filed March 3, 1955 2 Sheets-Sheet 1

INVENTOR
WILLIAM WOODS-HILL
BY [signature]
ATTORNEY

June 16, 1959 W. WOODS-HILL 2,890,830

ELECTRONIC ADDER APPARATUS WITH SUM RADIX CORRECTION MEANS

Filed March 3, 1955 2 Sheets-Sheet 2

INVENTOR
WILLIAM WOODS-HILL
BY [signature]
ATTORNEY

United States Patent Office 2,890,830

Patented June 16, 1959

2,890,830

ELECTRONIC ADDER APPARATUS WITH SUM RADIX CORRECTION MEANS

William Woods-Hill, Letchworth, England, assignor to The British Tabulating Machine Company Limited, London, England, a British company Application March 3, 1955, Serial No. 491,922

Claims priority, application Great Britain June 14, 1954

18 Claims. (Cl. 235—169)

This invention relates to electronic apparatus for performing the addition and subtraction of values, in which each digit is represented by a four component binary code.

It is an object of the present invention to provide electronic apparatus for adding two values digit by digit, the digits each being represented by a four component binary code.

It is a further object of the invention to provide means for forming the difference of two numbers by complemental addition.

According to the invention, electronic apparatus for summing two digits, each of which is represented by the voltages of four lines in combination, has a first group of adding devices operable by the voltages on said lines to produce first sum and carry representing outputs in a first scale of notation, detecting means operable by the first sum output to provide a second carry output when the first sum output is equal to, or greater than, the radix of a second scale of notation, means controlled by the carry outputs for generating voltages representing a "filler digit," a second group of adding devices operable by the first sum output and by the "filler digit" representing voltages to provide a second sum output in the second scale of notation, and control means, common to said detecting and "filler digit" generating means, for determining the radix of the second scale of notation.

The invention will now be described, by way of example, with reference to the accompanying drawings, in which.

The adding circuit is designed to add two sets of voltages presented simultaneously by triggers which have been set to correspond with one digit of each of two numbers to be added. Successive denominations of the numbers are presented to the adding circuit sequentially, beginning with the least significant.

These digits are coded in four components representing values 1, 2, 4, 8.

The adding circuit will make the necessary correction when the digits are in decimal, or non-decimal scales of notation.

Figure 1:
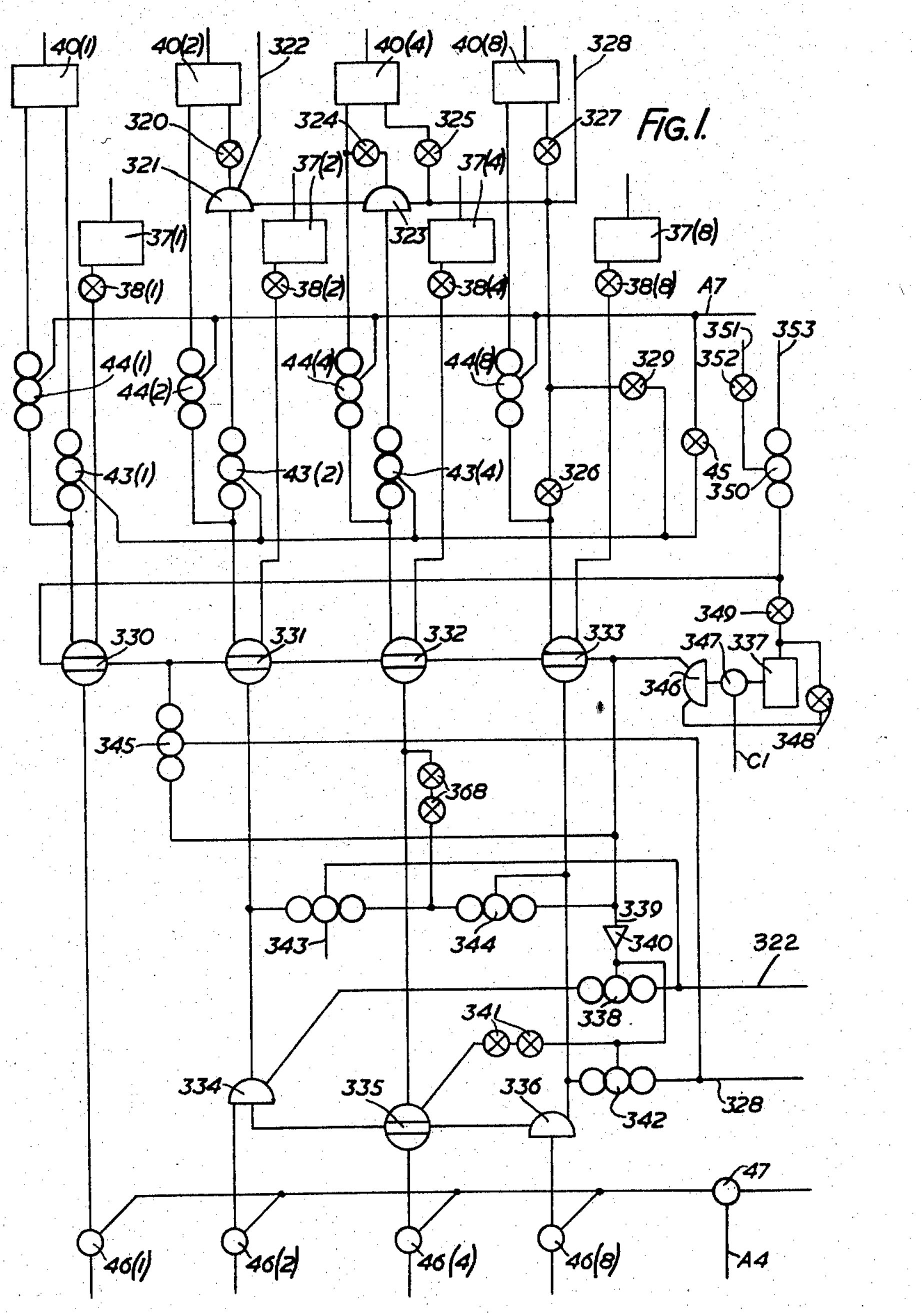
Figure 1 is a schematic block diagram of an arrangement for performing addition and subtraction.

The general mode of operation of the adding circuit will be considered with reference to the block diagram (Figure 1).

Four triggers 40(1), 40(2), 40(4), 40(8), are set by pulses to correspond with the code components of one of the digits. Voltages from the triggers 40, controlled by gates 43 and 44 are, in adders 330, 331, 332, 333, combined with voltages from triggers 37 representing the code components of the other digit. The output from each of the adders 330, 331, 332, 333, is a voltage which may have one of two values representing either "zero" or "one." The triggers are of known form and the presence of a code component is represented by the corresponding trigger circuit being "on."

If output voltages from the adders 330, 331, 332, 333 represent values of a digit exceeding nine in a decimal notation, a "filler digit" of six is necessary since the output is coded in a scale of sixteen. Similarly a "filler digit" of four will be required when in a pence scale the result exceeds eleven, or a "filler digit" of 14 when a tens of shillings digit is two.

Thus six and six will produce the result twelve in a scale of sixteen. By adding six the result is two with a carry of one (i.e. decimal notation), or by adding four the result becomes zero with a carry of one (i.e. duodecimal notation).

In general the value of the filler digit will be the difference between sixteen and the scale of notation used. It will need to be inserted whenever the result is inconsistent with the scale of notation in use.

The convention in the description that follows is that a negative voltage appearing at inputs to the triggers 40 or 37 represents the presence of a code component.

Each control voltage may assume either a high level or a low level. These levels are at different voltages in relation to the earth line according to whether the control voltage is supplied by a trigger, an inverter or a gate. However, for convenience, the high and low level will be referred to as positive and negative voltages, irrespective of their actual value in relation to earth.

To facilitate the understanding of the adding circuit, it is desirable to consider first the mode of operation of the basic circuit used for adding two code components. This circuit is equivalent to a two-input binary adder.

Figure 2:
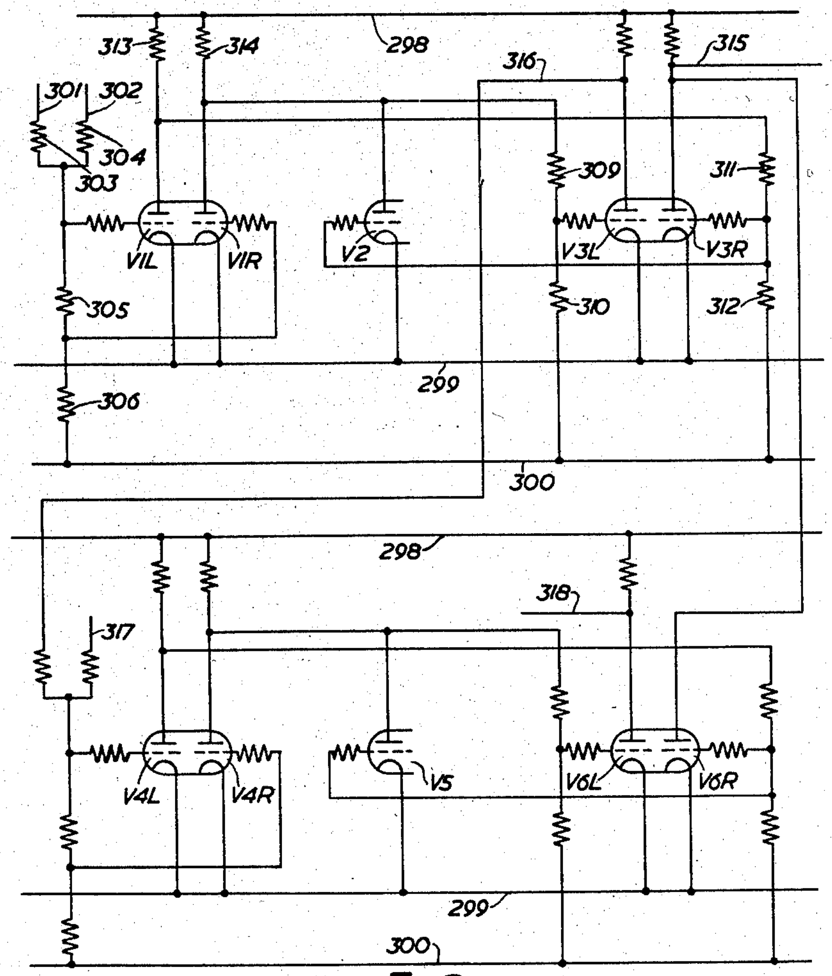
Figure 2 is a diagram of an adding circuit.

The two inputs are applied to the adder on lines 301 and 302 (Figure 2). For example, taking the detailed circuit of Figure 2 to represent the adder 330 (Figure 1), then the line 301 is connected to the commoned outputs of the gates 43(1) and 44(1). The input convention adopted is that for a zero, (no code component), the input line is positive and that for a one, (code component present), the input line is negative. The terms positive and negative are used in the same sense as in the case of a control voltage. The two input lines 301 and 302 are connected, through resistors 303 and 304 and resistors 305 and 306 in series, to a negative bias line 300.

The grid of a triode V1L is connected to the junction of the resistors 303 and 304, and the resistors 305, and the grid of a triode V1R is connected to the junction of the resistors 305 and 306.

When the two inputs are zero, both the lines 301 and 302 are positive, and the grids of V1L and V1R are held above cut-off. These two valves draw current through anode resistors 313 and 314 respectively, so that their anodes are low.

The anode of V1R is connected through resistors 309 and 310 to the bias line 300. With V1R conducting, the inverter triode V3L, the grid of which is connected to the junction of the resistors 309 and 310, is held non-conducting. The anode of V3L is therefore at the voltage of positive supply line 98. The voltage of a line 316, connected to the anode of V3L indicates the sum digit, which is zero, since the voltage is high.

In a similar way, the anode voltage of V1L controls conduction in a triode V3R, the grid of which is connected to the junction of resistors 311 and 312, which are connected between the anode of V1L and the line 300. Since V1L is conducting a line 315 connected to the anode of V3R will be indicating a carry digit of zero.

If the input is one and zero, one of the lines 301 and 302 will be positive and the other will be negative. The grid of V1L is still held above cut-off, so that the line 315 will still indicate a carry digit of zero. However, the grid of V1R will fall below cut-off. The increase in anode voltage of V1R allows V3L to conduct, and the line 316 becomes negative to indicate a sum digit of one.

If the input is one and one, both the lines 301 and 302 will be negative and both V1L and V1R will be cut-off. The high anode voltage of V1L allows V3R to conduct and the line 315 falls negative to indicate a carry digit of one.

The grid of a triode V2 is also connected to the junction of resistors 311 and 312, so that V2 is conducting when V1L is non-conducting and vice versa. The anode of V2 is connected to the anode of V1R, so that when V1L is non-conducting, V3L is also held non-conducting, due to conduction in V2. Thus the line 316 remains positive, indicating a sum digit of zero.

It will be appreciated that the valves V3L and V3R function solely as inverters; the sum and carry digits are available at the anodes of V1R and V1L respectively, but the digit convention is reversed. The inverters enable two or more two-input adders to be coupled in cascade.

The usual requirement is for a three-input adder, to deal with the sum of two components and a carry from a previous adder. This is met by connecting the sum line 316 to form one input of a second two-input adder. The carry from a preceding stage is connected to a line 317, which is the second input line. These two inputs control valves V4L and V4R to form sum and carry representing voltages, which are inverted by valves V6L and V6R. A line 318 connected to the anode of V6L assumes a voltage representing the sum of the three inputs. The anode of V6R is connected to the anode V3R, since, at most, only one of these two valves can be conductive for any combination of three inputs. Hence the line 315 assumes a voltage representing the carry digit derived from the three inputs.

In order to perform subtraction, the complement of the digit represented by the setting of the triggers 40 is fed to the adders 330, 331, 332, 333 through the gates 43.

Since the digits are coded in a scale of sixteen, the complement to ten is not obtained directly by inverting the code components, nor can complements to the other scales required for sterling calculations be obtained in this way.

The method of forming the complement is based on the fact that if the code components of a digit are inverted, that is "zero" is changed to a "one" and vice versa, the resulting digit is the complement to fifteen of the original digits. However, the complement is required to nine for a decimal digit or eleven for a pence digit. The correct complement is obtained by adding the base of the scale of notation to the complement of the digit to fifteen, and ignoring any carry which may occur. For example, the complement of seven to fifteen is eight and the addition of ten gives the complement to nine as two, with a non-significant carry. In fact, the "filler digit," that is, the difference between sixteen and the scale of notation, is fed to a complementing circuit, and the circuit itself converts this to the equivalent of adding ten for decimal, twelve for duo-decimal etc.

The gates 43 and 44 give a positive output except when both inputs are negative. Hence when a control line A7 is positive, the output from an inverter 45 will be negative and the gates 44 will be closed and the gates 43 will be open. The line A7 controlling the gates 43 and 44 is held negative for addition and positive for subtraction.

The input to the gate 43(1) is taken from the high anode of the trigger 40(1). Hence the output from the gate 43(1) will be "zero" for a "one" setting of 40(1) and vice versa.

The high anode of the trigger 40(2) drives an inverter 320, which feeds a two-input adder 321, which is indicated in block form by a semi-circle. The sum output from the adder is connected directly to the gate 43(2), without the use of an inverter stage corresponding to V3L (Figure 2). The carry output is inverted by a stage corresponding to V3R (Figure 2), and fed to a further two input-adder 323. The other input to the adder 321 comes from a line 322 which is negative, except when the triggers 40 are registering a pence value. This represents the entry of a "2 filler digit," except for the pence. Since the sum output of the adder 321 is not inverted, the output will be positive for a "one" and negative for a "zero." The output from the gate 43(2) for the specified inputs to the adder 321 will be as follows:

(1) Sum digit "one" for both inputs "zero."
(2) Sum digit "zero" for one input "zero" and one input "one."
(3) Sum digit "one" for both inputs "one."

For condition (3), there will also be a carry of "one" fed to the adder 323.

The second input to the adder 323 comes from the low anode of the trigger 40(4), through an inverter 324. Thus, if the trigger 40(4) is registering "zero," the adder 323 will receive an input of "one," which is equivalent to adding four to the entered digit. The high anode of the trigger 40(4) drives an inverter 325. The output from this inverter, which will be negative for a "one" setting of the trigger and positive for a "zero" setting, is fed to a further inverter 326. The output from the inverter 326 drives the "8" value input line of the adder 333. Thus a "one" setting of the trigger 40(4) is made equivalent to a corresponding setting of the trigger 40(8), so that four is added to the entered digit for either setting of the trigger 40(4).

The inverter 326 is driven from four other sources:

(1) It is connected to the high anode of the trigger 40(8) through inverter 327.

(2) From a line 328 which is positive except when tens of shillings are registered by the triggers 40, because for a tens of shillings denomination an additional "filler digit" of eight is required.

(3) It receives the carry output of adder 323, inverted in the usual manner.

(4) The output of the inverter 45 feeds an inverter 329, the output of which drives the inverter 326.

The inverter 329 prevents a complementary read out on the "8" value line, when the complementing circuit is set for a true read out. Under these conditions, the output from the inverter is negative and this maintains the anode of the inverter 326 high, irrespective of the voltages on the other input lines. In other words, a negative voltage overrides the effect of a positive voltage from any other input line.

When the circuit is set for complementary read out, the high voltage from the inverter 329 may be overridden by a low voltage on any of the other input lines. The operation of the circuit is such that only one of the input lines to the inverter 326 can assume a low voltage for any particular set of conditions.

As an example, the operation of the circuit will be considered for complementing the decimal digit six. The changes in the four parts of the circuit controlled by voltages representing the four code components are set out in a table below, in which X indicates the presence of a low or negative voltage and 0 the presence of a high or positive voltage.

| | 1 | 2 | 4 | 8 |
|---|---|---|---|---|
| A | 0 | X | X | 0 |
| B | X | | | |
| C | | | X | |
| D | | | 0 | |
| E | | | | 0 |
| F | X | X | 0 | 0 |

The triggers 40(1) and 40(8) will register "zero" and the triggers 40(2) and 40(4) will register "one" (as at A). The gate 43(1) will give a "one" output since it is driven from the high anode of the trigger 40(1) (as at B);

The adder 321 receives a "one" input from the trigger 40(2) since the high anode of the trigger is connected to the adder through the inverter 320, and a "one" input from the line 322. This produces a sum output of "one" since there is no inverter for the sum output line, together with a carry output of "one" (as at C).

The adder 323 receives a "one" output from the adder 321 and a "zero" input from the inverter 324, consequently there is a "zero" carry and a "zero" output since this adder is also without a sum inverter (as at D).

The inverter 326 is fed with a low voltage from the trigger 40(4) and with a high voltage from the other driving sources. The low voltage overrides the high voltage, to produce a high voltage at the output of the inverter 326, representing "zero" (as at E). Thus the output from the complementing circuit is as at F, that is three, the complement of six to nine.

Although the operation of the circuit has been described sequentially, the voltages representing the complement value of three will appear on the output lines almost as soon as the true value is set up on the triggers 40, since all the circuits are D.C. coupled. The speed of response is limited by finite rise time of the individual circuits due to stray capacities.

The four adders 330, 331, 332, 333, each have three inputs. The adder 330 receives one input from the trigger 37(1) and a second from the gate 44(1) or the gate 43(1) depending on whether the value is being entered in true or in complement form. The third input is controlled by a carry storage trigger 337, the setting of which is dependent upon the result of the previous digit addition.

The adders 331, 332 and 333 are similarly connected except that the third input is provided by the carry output of the adder dealing with the next lower code component. As already described the complement output from the "8" value code component is provided by the inverter 326.

Since the individual adders operate in binary, the output of the four adders represents a digit in a scale of sixteen. The necessary correction for decimal or other scales is effected by two-input adders 334 and 336 and a three-input adder 335. The occurrence of a result inconsistent with the scale of notation is detected, and controls the setting of the carry storage trigger and the addition of an appropriate "filler digit." The occurrence of a carry from the adder 333 will cause addition of a "filler digit."

Since there is no correction to the "1" code component, the output from the adder 330 controls a gate 46(1) directly. This gate requires a positive voltage to operate, so that the inverter on the sum output is omitted.

The sum output from the adder 331 is fed to the adder 334, which may also receive a "filler digit" of two from a gate 338. The gate 338 is controlled by the line 322, which controls addition of two in the complementing circuit, and by a carry line 339, through a cathode follower 340. The line 322 is negative, except when adding in the duo-decimal scale, as already explained. The line 339 will be negative if the adder 333 has generated a "one" carry. The combination of two negative inputs to the gate 338 produces a negative output from the gate. This causes the addition of the "filler digit" to the sum output of the adder 331. The sum output of the adder 334 controls a gate 46(2), and the carry output is fed to the adder 335.

The adder 335 also receives the sum output from the adder 332, and a "filler digit" of four if the line 339 is negative. The line 339 controls the adder 335, through the cathode follower 340 and two inverters 341 in cascade to provide isolation between the input of gates 338 and 342 and the adder 335 without inversion of the voltage applied to the adder 335. The sum output of the adder 335 controls a gate 46(4); the carry output is fed to the adder 336.

The sum output from the adder 333 is fed to the adder 336. A "filler digit" of eight is required only for the scale of two, when the output from the adder 333 can only be "zero." Accordingly, the output of a gate 342, which is controlled by the line 328 and by the cathode follower 340, is commoned with the output of the adder 333. The sum output of the adder 336 controls a gate 46(8). The carry output is not used, since any carry out of the denomination is generated by the adder 333, if the sum of the input digits is greater than fifteen, or by the circuits controlling the addition of the "filler digit."

The sum outputs of the adders 334, 335 and 336 control their respective gates without the use of an inverter, as in the case of the adder 330.

The occurrence of an "8" code component with a "4" and/or a "2," in the sum output of the four main adders, is detected by two gates 343 and 344. The gate 343 is controlled by the sum output of the adder 331 and the line 322. The output will be negative if there is a "2" in the sum and a "filler digit" of two. This output is fed to the gate 344, in common with the sum output from the adder 332 through two inverters 368. The gate 344 is also controlled by the output from the adder 333. The output from this gate, which is connected to the carry line 339, will be negative if there is an "8" in the sum output and the gate 343 is providing a negative output, or there is a "4" in the sum output. If the line 322 is positive for a duo-decimal denomination, it prevents a "2" in the sum from causing a carry.

The adder must operate in the scale of two during addition of the tens of shillings denomination. The "filler" digit required is therefore fourteen, which is entered as "8," together with "6" through the circuit used for decimal addition. Line 328 is negative during the addition of this denomination. If the adder 330 produces a carry, a gate 345 receives negative inputs from this adder and from the line 328. The resultant negative output of the gate is applied to the line 339 and causes the addition of "6" in the manner already described. A gate 342 is also controlled by the line 328 and by the output of the cathode follower 340. Hence this gate also produces a negative output which is applied as a "one" input to the adder 336, thus entering "8" in addition to "6" entered under control of the line 339.

To summarize, the gates 338, 342, 344 and 345 and their associated circuits constitute control means controlled by the potentials on lines 322 and 328 to determine the radix of the scale of notation of the output from the gates 46. In the case described, there are three possible radices, 12, 10 and 2, requiring respectively the addition of four, six and fourteen for correction purposes and the control potentials applied and their effects, described in detail above, may be summarized as follows:

(*a*) Radix of 12: Control lines 322 and 328 are both at a high potential. Gates 338, 342 and 345 give no output. A filler digit of four is applied to adder 335 if either there is a carry output from adder 333 or there is an output from gate 344 as a result of there being a sum output from both adders 332 and 333.

(*b*) Radix of 10: Control line 322 is at a low potential and control line 328 at a high one. Gates 338 and 343 are conditioned by the potential on line 322. In addition to the application of filler digit of four as described in (*a*) therefore, a filler digit of two is applied to adder 334 if either there is a carry output from adder 333 or there are sum outputs from either or both adders 331 and 332 as well as adder 333.

(*c*) Radix of 2: Control lines 322 and 328 are both at a low potential. Thus gates 342 and 345 are conditioned as well as the gates 338 and 343. Generation of a carry output from adder 330 (adders 331, 332 and 333 will never register a digit when this radix is used) produces a carry output on line 339, which, since line 322 is at a low potential, causes application of filler digits two and four to adders 334 and 335 respectively and the application of a filler digit eight to adder 336 from gate 342.

The carry line 339 is connected to a two-input adder 346 which controls setting of the carry storage trigger 337. The other input to the adder comes from the high anode of the trigger 337, through an inverter 348. The sum output of the adder controls a gate 347, without the use of an inverter, which gate also receives clock pulses on a line C1. The output from the gate is fed to the grids of the carry storage trigger. A positive pulse on the line C1 and on a line A4 through a gate 47 will open the gates 46 and set the trigger 337 for a carry forward to the next digit.

The adder 346 will produce a positive output if the two inputs are different, that is if the setting of the carry trigger does not agree with the state of the carry line 339. This will allow the gate 347 to feed a clock pulse to the trigger to set it to agree with the carry line. The high anode of the trigger 337 is also connected to one input of the adder 330, through an inverter 349. The read out gates 46 are controlled by the same clock pulses which effect setting of the trigger 337, so that each setting of the trigger is effective for carry entry in the addition of the denomination next after that which produced the setting.

The various voltages required to control the functions of the adding circuit are set out below.

(1) Line 353 connected to a gate 350 is normally held positive, but when adding the least significant digit it is made negative. If line 351 is also negative when complementing, a "one" entry will be made in adder 330, thus complementing the digit to ten instead of nine as with the other digits.

(2) If it is required to complement the least significant digit to ten instead of nine as explained above, the line 351 is made negative, otherwise it is normally held positive.

These control voltages are synchronised with the entry of pulses controlling the setting of the triggers 40 and 37, so that the correct operation of the adding circuit is ensured for each particular denomination of the numbers being added.

The gates 46 and 347 are operated by a positive pulse and a positive voltage which remains at a fixed value for a time which is long compared with the duration of the pulse. When both inputs are present, the gate produces a negative output pulse.

Figure 4:
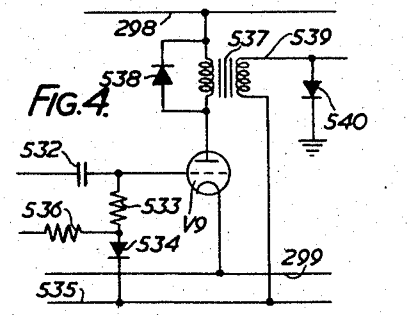
Figure 4 is a circuit diagram of a single valve gate.

These gates each comprise a single triode, and a typical circuit is shown in Figure 4. The control voltage is applied to the grid of a triode V9 through resistors 536 and 533. The junction of the resistors is connected to a −20 volt supply 535 through a diode 534. The control voltage is −10 volts or −70 volts, for the relatively positive and negative conditions.

Because of the diode, the grid of V9 is held at either −18 volts or −10 volts. In either case it is cut-off.

If a positive pulse of 20 volts amplitude is fed to the grid through a capacitor 532, the valve will conduct if the control line is at −10 volts but not if it is at −70 volts. A pulse transformer 537 in the anode circuit provides a positive pulse on a line 539 when V9 conducts. A diode 538, across the primary winding of the transformer, damps out any overshoot. A diode 540 across the secondary winding, limits the amplitude of the output pulse to 20 volts.

If a negative output pulse is required from the gates 46 (Figure 1) the transformer is replaced by an anode resistor.

Figure 3:
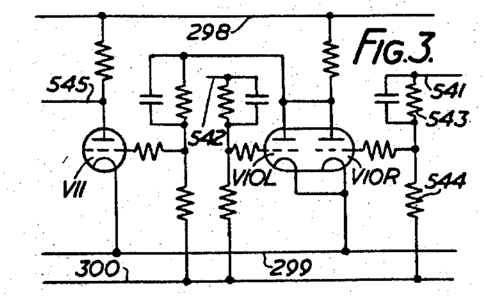
Figure 3 is a circuit diagram of a multi-valve gate.

The circuit of a multi-valve gate operating on two negative control voltages is shown in Figure 3. The gates 43 and 44 (Figure 1) for example, are of this type. The gates consist of three inverters V10L, V10R and V11. One control voltage, on a line 541, is fed to the grid of V10R, through a resistor 543. The grid is also connected to the −310 volt supply line 300, through a resistor 544. The grid is either at +2 volts or −45 volts, depending upon whether the control line is positive or negative.

The other control voltage, on a line 542, is fed to the grid of V10L, by a similar input circuit. V10L and V10R have a common anode load resistor, so that the anode voltage rises appreciably only when both the valves are cut off. This anode voltage is fed to the grid of V11, and the voltage of a line 545, connected to the anode of V11, will drop only when V10L and V10R are both cut off.

The valve V11 forms a typical D.C. inverter circuit corresponding to the inverters 320 and 368 (Figure 1) for example.

What we claim is:

1. Electronic apparatus for summing two digits, each of which is represented by the voltages of four lines in combination, having a first group of adding devices operable by the voltages on said lines to produce first sum and carry representing outputs in a first scale of notation, detecting means operable by the first sum output to provide a second carry output when the first sum output is equal to, or greater than, the radix of a second scale of notation different from said first notation, means controlled by the carry outputs for generating voltages representing a "filler digit" only where there is a first or a second carry output, a second group of adding devices operable by the first sum output and by the "filler digit" representing voltages to provide a second sum output in the second scale of notation, and control means settable according to a selected value from a plurality of possible values for the radix of the second scale of notation and conditioning said detecting and generating means to operate with said selected value as the radix of the second scale of notation.

2. Apparatus as claimed in claim 1 adapted for summing two numbers in which the digits occur in time sequence, commencing with the least significant denomination, having carry storage means and means, controlled by said carry outputs, for setting the carry storage.

3. Apparatus as claimed in claim 2, having read out means controlled by the second sum output and means for effecting simultaneously read out and setting of the carry storage.

4. Apparatus as claimed in claim 3, in which the code component values represented by a group of four input lines are 1, 2, 4 and 8 respectively, having four binary adders, each pair of input lines for a code component being connected to one of the adders.

5. Apparatus as claimed in claim 4, having a carry connection from each binary adder to the next high value binary adder and a carry connection from the carry storage to the lowest value binary adder, and in which each binary adder is so arranged that it provides the appropriate sum and carry representing voltages for as long as input voltages are applied thereto.

6. Apparatus as claimed in claim 5, in which the second carry output is provided by at least two gating means, which are selectively rendered operative under control of voltages from said control means.

7. Apparatus as claimed in claim 6, having first gating means operable to provide said second carry output under joint control of the sum representing voltages of the adders for the 2, 4 and 8 code components.

8. Apparatus as claimed in claim 7, having second gating means operable to provide said second carry output under joint control of the sum representing voltage of the adder for the 2 code component and said control means.

9. Apparatus as claimed in claim 8, in which the first gating means is controlled by the output from the second gating means.

10. Apparatus as claimed in claim 6, having a third gating means which is controlled jointly by the control means and by the carry representing voltage from the adder for the 1 code component.

11. Apparatus as claimed in claim 5, having an adder in said second group which is operated by the sum representing voltage of the adder for the 4 code component and by said first and second carry output.

12. Apparatus as claimed in claim 11, having adders in the second group for the 2 and 8 value code components.

13. Apparatus as claimed in claim 12, having a trigger circuit for carry storage, means for comparing the value representing state of the trigger with the value represented by said first and second carry outputs, and means controlled by said comparing means for setting the trigger to register a carry if either carry output represents a carry, and to register no carry if both outputs represent no carry.

14. Apparatus as claimed in claim 1, having two groups of input trigger circuits which are set to represent the values of two digits to be summed, and which determine the voltages of the input lines.

15. Apparatus as claimed in claim 14, having input gating means associated with one group of input trigger circuits, the corresponding input lines representing the value, or the complement of the value, of the digit registered by said trigger circuits, when the gating means are in a first and second state respectively.

16. Apparatus as claimed in claim 15, in which said control means also determines the radix of notation of the complement value, when the input gating means is in said second state.

17. Electronic apparatus for summing two digits, comprising a first group of four lines, the successive voltages of which represent in a prescribed code successive denominational values of one said digits, a second group of four lines, the successive voltages of which represent in said code successive denominational values of the other said digit, a first group of adding devices controlled by the voltages on said lines for giving outputs representing respectively the sums and carries of said successive denominational values of said digits, detecting means controlled by said sum output for detecting when said sum output represents a value between and including the radix of a second scale of notation which is different from the radix of said first scale and the largest value that can be represented in said first scale of notation, further adding means to which said sum output is applied, means for generating voltages representing a "filler digit," means controlled by said detecting means and said carry output for applying said filler digit-representing voltages to said further adding means when said output represents a value at least equal to the radix of notation or when there is a carry output, and means settable according to a selected value from a plurality of possible values for the radix of the second notation and conditioning said detecting means and said generating means to operate with said selected value as the radix of the second scale of notation.

18. Electronic apparatus for summing two digits comprising a first group of four devices, for generating voltages which represent in a prescribed code one said digit, a second group of four devices for generating voltages which represent in a prescribed code another said digit, four adding devices, each said adding device being controlled by the generated voltages of one generating device of said first group, and the corresponding generating device of said second group, and said adding devices generating on four output lines voltages representing in a first scale of notation the sum of said digits and on a carry line a carry-representing voltage, detecting means controlled by the voltages on said four output lines for detecting when said sum is between and including the radix of a second scale of notation which is different from the radix of said first scale and the largest value that can be represented in said first scale of notation, further adding means to which at least some of said output lines are connected, means for generating voltages representing a filler digit, means controlled by said carry-representing voltage and by said detecting means for applying to said further adding means said filler digit-representing voltages when said sum is at least equal to the radix of said second scale of notation or when there is a carry, and means settable according to a selected value from a plurality of possible values for the radix of the second notation and conditioning said generating means and said detecting means to operate with said selected value as the radix of said second scale of notation.

References Cited in the file of this patent

UNITED STATES PATENTS

| | | |
|---|---|---|
| 2,571,680 | Carbrey | Oct. 16, 1951 |
| 2,623,115 | Woods-Hill et al. | Dec. 23, 1952 |
| 2,668,661 | Stibitz | Feb. 9, 1954 |
| 2,691,100 | Moody et al. | Oct. 5, 1954 |
| 2,705,108 | Stone | Mar. 29, 1955 |

FOREIGN PATENTS

| | | |
|---|---|---|
| 1,043,321 | France | June 10, 1953 |
| 1,097,292 | France | Feb. 16, 1955 |

OTHER REFERENCES

Synthesis of Electronic Computing and Control Circuits—Staff of Computation Lab., Harvard Univ. Press, Cambridge, Mass.; copyright, 1951; pages 184 to 186.

Townsend: Serial Digital Adders for a Variable Radix of Notation, Electronic Engineering (British), October 1953, pages 410 to 416.

Progress Report #2 on the EDVAC, Moore School of Engineering, Univ. of Pa. (pages 1-1-29, 1-1-30; Fig. PY-0-181, total of 3 sheets). Available to Industry Feb. 13, 1953.